United States Patent
Long et al.

(10) Patent No.: US 7,438,660 B2
(45) Date of Patent: *Oct. 21, 2008

(54) PRESSURE REGULATOR VALVE WITH BOOST FEATURE

(75) Inventors: Charles F. Long, Pittsboro, IN (US); Jeffrey J. Cole, Plainfield, IN (US); Phillip F. McCauley, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 195 days.

This patent is subject to a terminal disclaimer.

(21) Appl. No.: 11/333,152

(22) Filed: Jan. 17, 2006

(65) Prior Publication Data

US 2007/0167267 A1 Jul. 19, 2007

(51) Int. Cl.
*F16H 63/04* (2006.01)
(52) U.S. Cl. ........................ 475/127; 137/495
(58) Field of Classification Search ................. 475/122, 475/127, 128; 477/127, 130
See application file for complete search history.

(56) References Cited

U.S. PATENT DOCUMENTS

| 5,669,473 | A | | 9/1997 | Long et al. ............ 192/3.3 |
| 5,842,953 | A | * | 12/1998 | Yasue et al. ............ 477/174 |
| 5,911,244 | A | | 6/1999 | Long et al. ............ 137/625.64 |
| 6,155,949 | A | | 12/2000 | Long et al. ............ 475/127 |
| 2007/0167285 | A1 | * | 7/2007 | Long et al. ............ 477/182 |

* cited by examiner

*Primary Examiner*—Sherry Estremsky
*Assistant Examiner*—Edwin A Young

(57) ABSTRACT

A pressure regulator valve is provided having a valve spool slidably disposed within a stepped bore defined by a valve body. A first pressure responsive surface area is defined on the valve spool and is subject to pressurized fluid from a main pressure source. A second pressure responsive surface area is defined on the valve spool and is subject to pressurized fluid from a control source. Additionally, a third pressure responsive surface area is defined on the valve spool and is selectively subject to pressurized fluid from one of the main pressure source and the control source. A sleeve is slidably disposed within the stepped bore, the sleeve being operable to selectively distribute pressurized fluid from one of the main pressure source and the control source to the third pressure responsive surface area to effect a change in pressure gain of the pressure regulator valve.

12 Claims, 2 Drawing Sheets

PRESSURE REGULATOR VALVE WITH BOOST FEATURE

TECHNICAL FIELD

This invention relates to hydraulic pressure regulator valves, and more specifically to main pressure regulator valves within a shiftable vehicular transmission control system.

BACKGROUND OF THE INVENTION

Automatically shiftable transmissions used in transportation vehicles, such as cars, buses, and trucks, require a positive displacement pump to supply pressurized hydraulic fluid for engagement of clutches and brakes, torque converter operation, and cooling.

These pumps require power from the engine or prime mover to supply the required control pressure. The power absorbed by the pump and therefore supplied by the engine is a function of the pressure and displacement of the pump. The higher the pump output pressure or main pressure of the transmission, the more horsepower required from the engine.

Current transmissions utilize control mechanisms having electronic systems. These electronic systems are supplied with signals from the engine, vehicle, and transmission. The signals are utilized to determine the operation of various solenoid valves within the control system to modulate various pressures including the main pressure or line pressure of the transmission. By modulating the main pressure, the fuel economy of the vehicle may be improved.

SUMMARY OF THE INVENTION

Provided is a pressure regulator valve adapted to be in fluid communication with a main pressure source of pressurized fluid and in selective fluid communication with a main modulation control source of pressurized fluid. The pressure regulator valve includes a valve spool slidably disposed within a stepped bore defined by a valve body. A first pressure responsive surface area is defined by the valve spool and is subject to pressurized fluid from the main pressure source. A second pressure responsive surface area is defined by the valve spool and is subject to pressurized fluid from the control source. A third pressure responsive surface area is defined by the valve spool, and is selectively subject to pressurized fluid from one of the main pressure source and the control source. A sleeve is slidably disposed within the stepped bore. The sleeve operates to selectively distribute pressurized fluid from one of the main pressure source and the control source to the third pressure responsive surface area to effect a change in pressure gain of the pressure regulator valve. The sleeve has a pressure set position and a spring set position. The pressure set position corresponds to a boosted or high gain mode of operation and the spring set position corresponds to an un-boosted or low gain operating mode.

Another aspect of the invention is a transmission control system including a main source of pressurized fluid and a control source of pressurized fluid. A main pressure regulator for establishing the pressure output of the main source of pressurized fluid at a main pressure level is provided. The main pressure regulator has first pressure responsive surface area subject to pressurized fluid within the main source. The main pressure regulator also includes a second pressure responsive surface area which, when subjected to pressurized fluid within the control source, will limit the main pressure level. The main pressure regulator further includes a third pressure responsive surface area which, when supplied with pressurized fluid within the control source, will increase the limit of the main pressure level. A sleeve is slidably disposed within the main pressure regulator, the sleeve having a first position and a second position. The sleeve is operable in the first position to exhaust fluid pressure at the third pressure responsive surface area and is operable in the second position to direct pressurized fluid within the control source to the third pressure responsive surface area to enforce an increase in the main pressure level.

An additional aspect of the present invention is a transmission control system includes a main source of pressurized fluid and a control source of pressurized fluid. A main pressure regulator for establishing the pressure output of the main source of pressurized fluid at a main pressure level is provided. The main pressure regulator has a first pressure responsive surface area subject to pressurized fluid within the main source. The main pressure regulator also includes a second pressure responsive surface area which, when subjected to pressurized fluid within the control source, will limit the main pressure level. Also included is a third pressure responsive surface area which, when supplied with pressurized fluid within the main source, will decrease the limit of the main pressure level. A sleeve is slidably disposed within the main pressure regulator. The sleeve has a first position and a second position. The sleeve is operable in the second position to exhaust fluid pressure at the third pressure responsive surface area and is operable in the first position to direct pressurized fluid within the main source to the third pressure responsive surface area to provide a decrease in the main pressure level.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
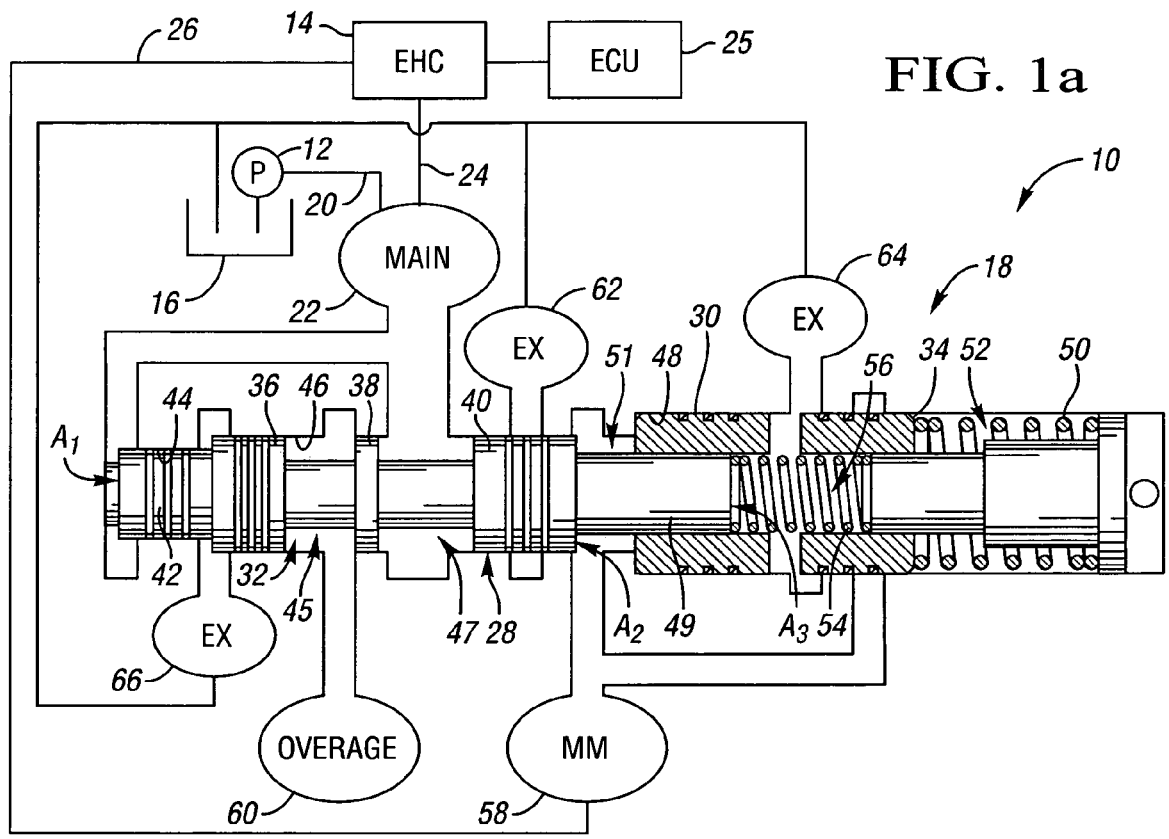
FIG. 1a is a schematic representation of a control system for a power transmission illustrating a main regulator valve, consistent with the present invention, in an un-boosted or low gain position.
Figure 1B:
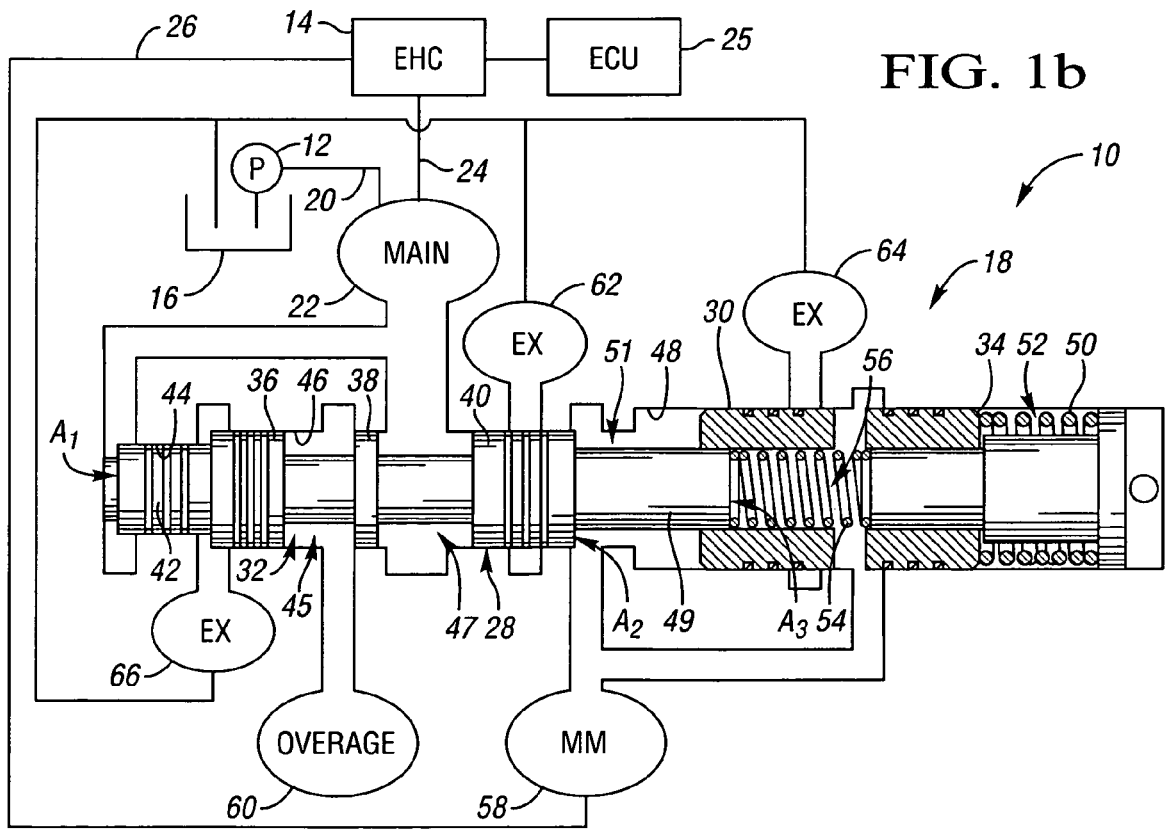
FIG. 1b is a schematic representation of the control system for a power transmission shown in FIG. 1a with the main regulator valve in a boosted or high gain position.

Referring to the drawings wherein like characters represent the same or corresponding parts, there is seen in FIGS. 1a and 1b a portion of a transmission control system 10 including a pump 12 and an electro-hydraulic control, or EHC, 14. The pump 12 is a conventional positive displacement mechanism that draws hydraulic fluid from a reservoir 16 and delivers the fluid to a main regulator valve 18 though a passage 20. The main regulator valve 18 is operable to vary the pressure of the fluid delivered by the pump 12. The fluid is subsequently communicated from a main pressure source 22 to the EHC 14 through a line pressure or main pressure passage 24.

The EHC 14 communicates with an electronic control unit (ECU) 25 having a conventional pre-programmable digital computer. The EHC 14 also includes control valves that distribute hydraulic fluid to the many devices in an automatic transmission including the torque transmitting mechanisms. The ECU 25, as is well-known, emits electrical control signals to various electronic elements such as solenoid valves, which in turn control the output pressure of the hydraulic valves. The EHC 14 produces a variable hydraulic control signal that is distributed through a trim passage 26 to provide a control signal to modulate the main regulator valve 18. The hydraulic control signal may be produced by a solenoid valve, such as a variable bleed solenoid valve, within the EHC 14.

The main regulator valve 18 has a valve spool 28 and a sleeve 30 slidably disposed in concentric longitudinal arrangement within a stepped valve bore 32 that is defined by a valve body 34. The valve spool 28 has spaced equal diameter lands 36, 38, and 40, and a smaller end land 42. The end land 42 is positioned in a bore portion 44 of the valve bore 32, and the lands 36, 38, and 40 are positioned in a bore portion 46 of the valve bore 32. The lands 36 and 38 are spaced such that a generally annular valley 45 is formed. Similarly, the lands 38 and 40 are spaced such that a generally annular valley 47 is formed. The sleeve 30 is positioned in a bore portion 48 of the valve bore 32. The sleeve 30 is piloted on a land 49 and is spaced from the land 40 to form a generally annular valley 51. The bore portion 46 is larger in diameter than the bore portion 44, while the bore portion 48 is larger in diameter than the bore 46. A spring 50 is disposed within a spring pocket 52 and operates to bias the sleeve 30. A spring 54 is disposed within a spring pocket 56. The spring 54 imposes a bias force on the valve spool 28 to urge the valve spool 28 leftward as viewed in FIGS. 1a and 1b. It should be noted that in the present embodiment, the spring pockets 52 and 56 do not communicate with one another.

The valve body 34 communicates with the main pressure source 22 that is in fluid communication with the passage 20 and the main pressure passage 24. The valve body 34 is in selective fluid communication with a main modulation control source 58 connected with the passage 26, an overage port 60, and exhaust ports 62, 64, and 66. The exhaust ports 62, 64, and 66 communicate with the reservoir 16. The main pressure source 22 is in fluid communication with the valley 47. The main modulation control source 58 is in selective fluid communication with the valley 51 and the spring pocket 56. The overage port 60 is selectively opened to the main pressure source 22 by the land 38. The exhaust port 62 is selectively opened and closed by the land 40. The exhaust port 64 and the main modulation control source 58 are selectively and alternately opened to the spring pocket 56 by the sleeve 30.

The land 42 forms a pressure responsive surface area $A_1$. While the lands 40 and 49 form a pressure responsive differential surface area $A_2$. The land 49 forms a pressure responsive surface area $A_3$. In operation, the main regulator valve 18 regulates or controls the fluid pressure within the main pressure passage 24, which is subsequently introduced to the EHC 14. FIG. 1a illustrates the main regulator valve 18 with the valve spool 28 in the low gain or un-boosted condition. With the valve spool 28 in the spring set position, as shown in FIG. 1a, the fluid pressure within the main pressure passage 24 is substantially unregulated and is generally the same pressure as the fluid within passage 20. As the fluid pressure within the main pressure source 22 increases, the force acting on surface area $A_1$ of the land 42 increases, thereby moving the valve spool 28 rightward, as viewed in FIGS. 1a and 1b, against the bias of spring 54. As the valve spool 28 moves rightward, the land 38 will open the main pressure source 22 to the valley 45 allowing pressurized fluid to flow to the overage port 60. The overage port 60 communicates fluid to other portions of the vehicles transmission such as, for example, a lubrication circuit or a cooler. By diverting an amount of pressurized fluid from the main pressure source 22 to the overage port 60, the fluid pressure within the main pressure passage 24 may be regulated to the desired level. The main modulation control source 58 selectively and variably provides fluid pressure to valley 51. This pressure acts on the differential surface area $A_2$ to counteract the movement of the valve spool 28 in response to the fluid pressure within the main pressure source 22. With the sleeve 30 in the spring set position, as shown in FIG. 1, the pressurized fluid within the main modulation control source 58 is blocked from entering the spring pocket 56 and subsequently acting on the surface area $A_3$ of land 49. Instead, the spring pocket 56 exhausts through the exhaust port 64.

By controlling the ratio of $A_1$ to $A_2$ in the design stage of the main regulator valve 18, the gain rate for the un-boosted condition may be controlled. This is stated in equation form as Pmain*$A_1$=Pmm*$A_2$+F, where Pmain is the fluid pressure within the main pressure source 22, Pmm is the fluid pressure within the main modulation control source 58, and F is the spring force exerted by the spring 54.

As the fluid pressure requirement of the EHC 14 increases, the main pressure regulator 18 will operate in a high gain or boosted condition, as shown in FIG. 1b. The fluid pressure within the main pressure source 22 increases in response to the higher fluid pressure within the main modulation control source 58. As the pressure within the valley 51 increases, the fluid pressure biases the sleeve 30 against the bias force exerted by the spring 50. When the bias force is overcome, the sleeve 30 will move to a pressure set position within the bore 32, as shown in FIG. 1b. With the sleeve 30 in the pressure set position, the exhaust port 64 is blocked such that the spring pocket 56 will no longer exhaust. Instead, the sleeve 30 will communicate pressurized fluid from the main modulation control source 58 to the spring pocket 56. The pressurized fluid within the main modulation control source 58 acts on both the differential surface area $A_2$ and the surface area $A_3$.

By controlling the ratio of $A_1$ to ($A_2$+$A_3$) in the design stage of the main regulator valve 18, the gain rate in the boosted operating mode may be controlled. This is stated in equation form as Pmain*$A_1$=Pmm*($A_2$+$A_3$)+F.

Figure 2A:
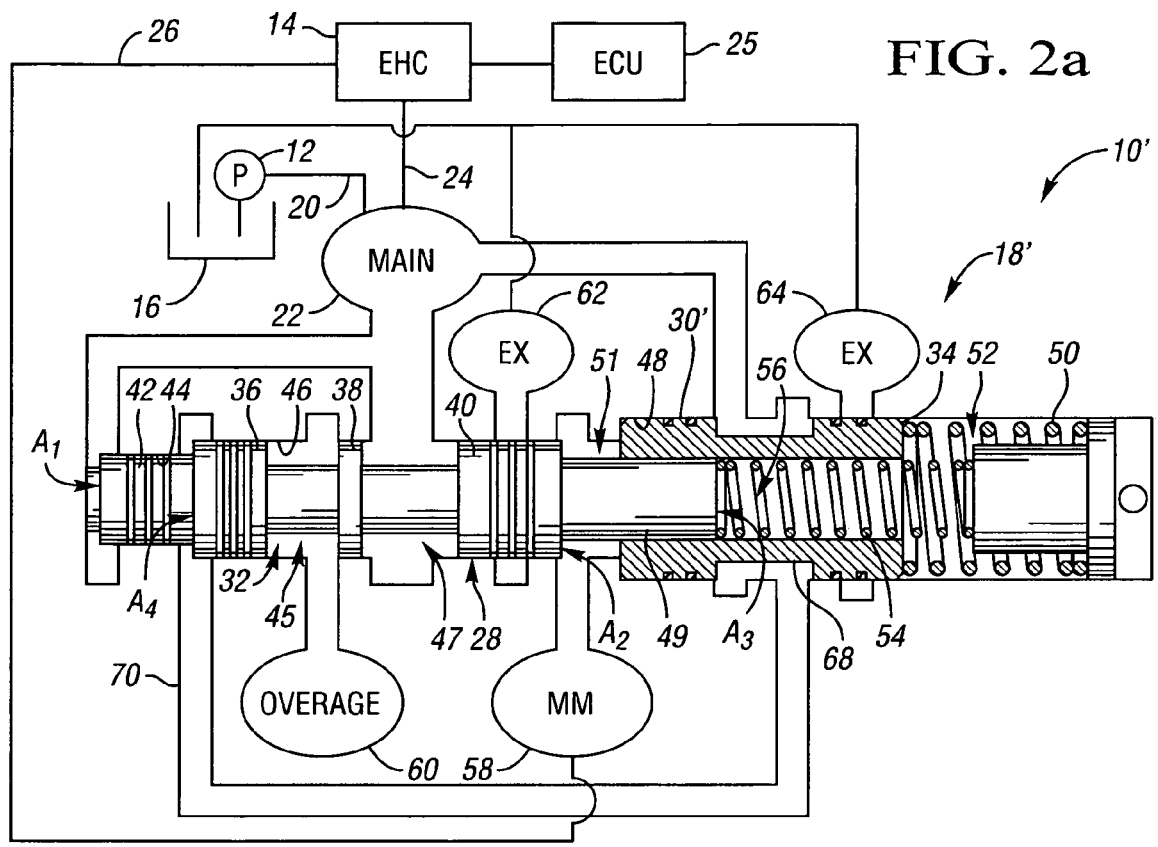
FIG. 2a is a schematic representation of a control system for a power transmission incorporating an alternate embodiment of a main regulator valve in an un-boosted or low gain position.
Figure 2B:
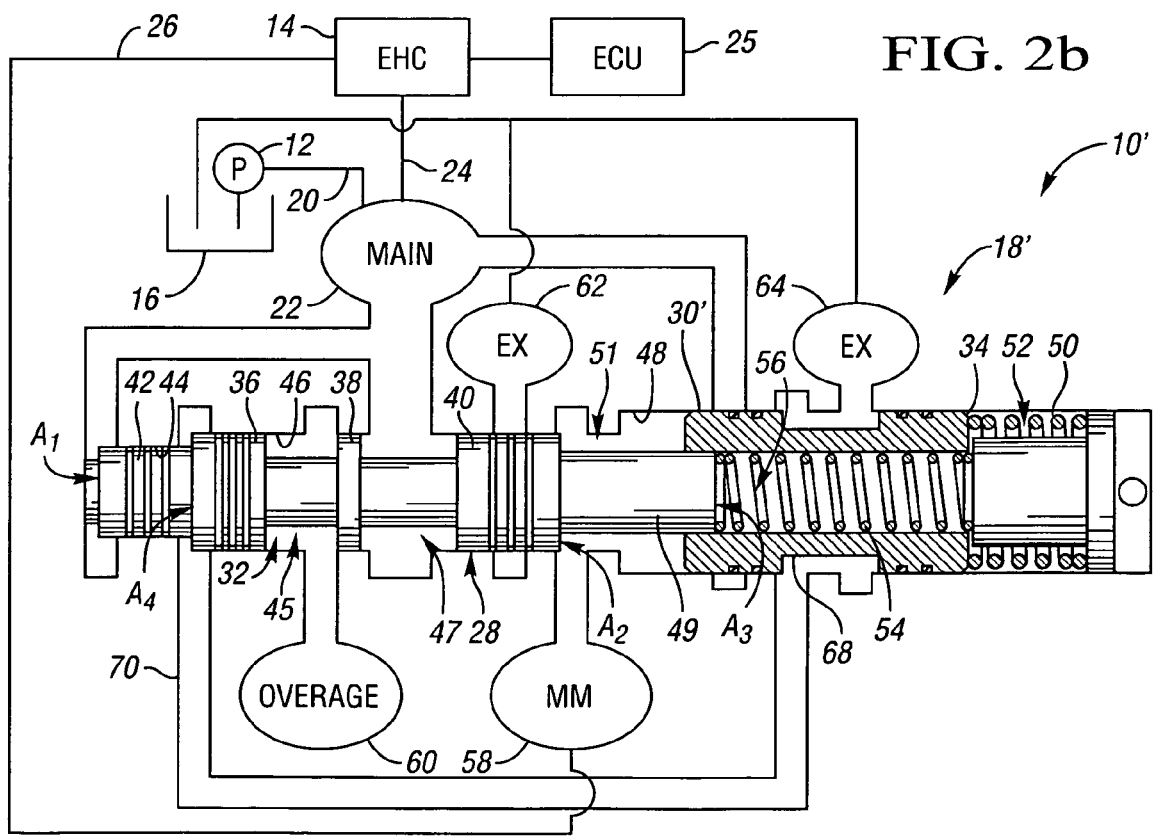
FIG. 2b is a schematic representation of the control system for a power transmission shown in FIG. 2a with the main regulator valve in a boosted or high gain position.

An alternate embodiment of the present invention is shown in FIGS. 2a and 2b. Referring to FIGS. 2a and 2b a portion of a transmission control system 10' is shown having a main pressure regulator 18'. The main pressure regulator 18' is similar in construction to the main pressure regulator 18, shown in FIGS. 1a and 1b. A sleeve 30' is slidably disposed within the valve bore 32 that is defined by the valve body 34. The sleeve 30' defines an annular groove or valley 68 that is operable to selectively pressurize a passage 70 with pressurized fluid from the main pressure source 22. When the sleeve 30' in the spring set position, as shown in FIG. 2a, pressurized fluid is communicated from the main pressure port 22 to the passage 70 via valley 68. The passage 70 communicates pressurized fluid to act on a pressure responsive differential surface area $A_4$ created by the valve lands 36 and 42. Alternately, with the sleeve 30' in the pressure set position, as shown in FIG. 2b, the passage 70 will exhaust to the exhaust port 64 via the valley 68. In this embodiment, the spring pockets 56 and 52 are in fluid communication with one another.

In operation, the main regulator valve 18' regulates or controls the fluid pressure within the main passage 24, which is subsequently introduced to the EHC 14. FIG. 2a illustrates the main regulator valve 18' with the valve spool 28 in the low pressure gain or un-boosted condition. With the valve spool 28 in the spring set position, as shown in FIG. 2a, the fluid pressure within the main pressure passage 24 is substantially unregulated and is generally the same pressure as the fluid within passage 20. As the fluid pressure within the main pressure source 22 increases, the force acting on surface area $A_1$ of the land 42 increases, thereby moving the valve spool 28 rightward, as viewed in FIGS. 2a and 2b, against the bias of spring 54. Additionally, with the sleeve 30' in the spring set position, pressurized fluid within the main pressure source 22 is communicated to the passage 70 via valley 68. The pressurized fluid within the passage 70 acts on the differential surface area $A_4$, which further biases the valve spool 28 against the bias of spring 54. As the valve spool 28 moves rightward, the land 38 will open the main pressure source 22 to the valley 45 allowing pressurized fluid to flow to the overage port 60. The overage port 60 communicates fluid to other portions of the vehicle transmission such as, for example, a lubrication circuit or a cooler. By diverting an amount of pressurized fluid from the main pressure source 22 to the overage port 60, the fluid pressure within the main pressure passage 24 is regulated to the desired level. The main modulation control source 58 selectively and variably provides fluid pressure to valley 51. This pressure acts on the differential surface area $A_2$ to counteract the movement of the valve spool 28 in response to the fluid pressure within the main pressure source 22.

By controlling the ratio of $(A_1+A_4)$ to $A_2$ in the design stage of the main regulator valve 18', the gain rate for the un-boosted condition may be controlled. This is stated in equation form as $Pmain*(A_1+A_4)=Pmm*A_2+F$. It should be appreciated that the sum of $(A_1+A_4)$ is equal to the sum of $(A_2+A_3)$.

As the Fluid pressure requirement of the EHC 14 increases, the main pressure regulator 18' will operate in a high gain or boosted condition, as shown in FIG. 2b. The fluid pressure within the main pressure source 22 will increase in response to the higher fluid pressure within the main modulation control source 58. As the pressure within the valley 51 increases, the fluid pressure biases the sleeve 30' against the bias force exerted by the spring 50. When the bias force is overcome, the sleeve 30' will move to a pressure set position within the bore 32, as shown in FIG. 2b. With the sleeve 30' in the pressure set position, the main pressure source 22 is blocked, thereby disallowing any flow of pressurized fluid into the passage 70. Instead, the sleeve 30 will allow pressurized fluid within the passage 70 to exhaust to the exhaust port 64 via valley 68. By exhausting the passage 70, the pressurized fluid acting on the differential surface area $A_4$ is also exhausted, such that the force urging the valve spool 28 rightward against the bias force of the spring 54 and the force of the pressurized fluid within the main modulation control source 58 acting on the differential surface area $A_2$ are reduced.

By controlling the ratio of $A_1$ to $A_2$ in the design stage of the main regulator valve 18', the gain rate in the boosted operating mode may be controlled. This is stated in equation form as $Pmain*A_1=Pmm*A_2+F$.

The main pressure regulators 18 and 18' provide two modes of operation, un-boosted and boosted. By providing an un-boosted mode of operation, the low pressure limit for regulation is reduced while improving resolution and system stability. Additionally, by providing a boosted operating mode, the high pressure limit may be increased. In one such transmission, the minimum operating pressure range is as low as 25 pounds per square inch, or psi, while the maximum is as high as 275 psi. This affords an effective regulation range ratio of over 10 to 1 compared to 5 to 1 for other transmissions.

While the best modes for carrying out the invention have been described in detail, those familiar with the art to which this invention relates will recognize various alternative designs and embodiments for practicing the invention within the scope of the appended claims.

The invention claimed is:

1. A pressure regulator valve adapted to be in fluid communication with a main pressure source of pressurized fluid and in selective fluid communication with a main modulation control source of pressurized fluid, the pressure regulator valve comprising:
   a valve spool slidably disposed within a stepped bore defined by a valve body;
   a first pressure responsive surface area defined by said valve spool, said first pressure responsive surface area being subject to pressurized fluid from the main pressure source;
   a second pressure responsive surface area defined by said valve spool, said second pressure responsive surface area being subject to pressurized fluid from the control source;
   a third pressure responsive surface area defined by said valve spool, said third pressure responsive surface area being selectively subject to pressurized fluid from one of the main pressure source and the control source; and
   a sleeve slidably disposed within said stepped bore, said sleeve being operable to selectively distribute pressurized fluid from said one of the main pressure source and the control source to said third pressure responsive surface area to effect a change in pressure gain of the pressure regulator valve.

2. The pressure regulator valve of claim 1, wherein said sleeve has a pressure set position and a spring set position, said pressure set position corresponding to a boosted or high gain mode of operation and said spring set position corresponding to an un-boosted or low gain operating mode.

3. A transmission control system comprising:
   a main source of pressurized fluid;
   a control source of pressurized fluid;
   a main pressure regulator for establishing the pressure output of said main source of pressurized fluid at a main pressure level;
   said main pressure regulator having first pressure responsive surface area subject to pressurized fluid within said main source, and a second pressure responsive surface area which, when subjected to pressurized fluid within said control source, will limit said main pressure level, and a third pressure responsive surface area which, when supplied with pressurized fluid within said control source, will increase the limit of said main pressure level;
   a sleeve slidably disposed within said main pressure regulator, said sleeve having a first position and a second position; and
   said sleeve being operable in said first position to exhaust fluid pressure at said third pressure responsive surface area and being operable in said second position to direct pressurized fluid within said control source to said third pressure surface area to provide an increase in said main pressure level.

4. The transmission control system of claim 3, wherein the sleeve moves from said first position to said second position in response to an increase in fluid pressure within said control source.

5. The transmission control system of claim 3, wherein the sleeve moves from said first position to said second position against the bias of a spring.

6. The transmission control system of claim 3, wherein said first, second, and third pressure responsive surface areas are disposed on a valve spool slidably disposed within said main pressure regulator.

7. The transmission control system of claim 6, wherein said valve spool is biased against a spring, said spring being disposed within a spring pocket.

8. The transmission control system of claim 7, wherein said sleeve selectively pressurizes said spring pocket with pressurized fluid from within said control source to act on said third pressure responsive surface area.

9. A transmission control system comprising:
- a main source of pressurized fluid;
- a control source of pressurized fluid;
- a main pressure regulator for establishing the pressure output of said main source of pressurized fluid at a main pressure level;
- said main pressure regulator having first pressure responsive surface area subject to pressurized fluid within said main source, and a second pressure responsive surface area which, when subjected to pressurized fluid within said control source, will limit said main pressure level, and a third pressure responsive surface area which, when supplied with pressurized fluid within said main source, will decrease the limit of said main pressure level;
- a sleeve slidably disposed within said main pressure regulator, said sleeve having a first position and a second position; and
- said sleeve being operable in said second position to exhaust fluid pressure at said third pressure responsive surface area and being operable in said first position to direct pressurized fluid within said main source to said third pressure responsive surface area to provide a decrease in said main pressure level.

10. The transmission control system of claim 9, wherein the sleeve moves from said first position to said second position in response to an increase in fluid pressure within said control source.

11. The transmission control system of claim 9, wherein the sleeve moves from said first position to said second position against the bias of a spring.

12. The transmission control system of claim 9, wherein said first, second, and third pressure responsive surface areas are disposed on a valve spool slidably disposed within said main pressure regulator.

* * * * *